United States Patent [19]
Reason et al.

[11] Patent Number: 6,148,628
[45] Date of Patent: Nov. 21, 2000

[54] ELECTRONIC EXPANSION VALVE WITHOUT PRESSURE SENSOR READING

[75] Inventors: John Robert Reason, Liverpool; Joao Eduardo Navarro de Andrade, Cicero, both of N.Y.

[73] Assignee: Carrier Corporation, Syracuse, N.Y.

[21] Appl. No.: 09/277,333

[22] Filed: Mar. 26, 1999

[51] Int. Cl.[7] .................................................. F25B 41/04
[52] U.S. Cl. ................. 62/223; 62/211; 62/225
[58] Field of Search ............................. 62/204, 205, 206, 62/210, 211, 212, 222, 223, 224, 225

[56] References Cited

U.S. PATENT DOCUMENTS

| | | |
|---|---|---|
| 4,134,272 | 1/1979 | Reimann . |
| 4,735,055 | 4/1988 | Taylor et al. . |
| 4,745,767 | 5/1988 | Ohya et al. ................................ 62/211 |
| 4,903,495 | 2/1990 | Howland et al. ........................... 62/224 |
| 5,067,556 | 11/1991 | Fudono et al. . |
| 5,131,237 | 7/1992 | Valbjorn ................................. 62/223 X |
| 5,182,920 | 2/1993 | Matsuoka et al. ..................... 62/211 X |
| 5,291,745 | 3/1994 | Hanson . |
| 5,463,876 | 11/1995 | Bessler et al. .............................. 62/223 |
| 5,546,756 | 8/1996 | Ali .............................................. 62/212 |
| 5,557,938 | 9/1996 | Hanson et al. . |
| 5,598,718 | 2/1997 | Freund et al. . |
| 5,625,276 | 4/1997 | Scott et al. . |
| 5,626,027 | 5/1997 | Dormer et al. . |
| 5,628,205 | 5/1997 | Rockenfeller et al. . |
| 5,661,378 | 8/1997 | Hapeman . |
| 5,715,704 | 2/1998 | Cholkeri et al. .......................... 62/222 |
| 5,771,703 | 6/1998 | Rajendran ................................. 62/212 |
| 5,780,998 | 6/1998 | Scott et al. . |
| 5,798,577 | 8/1998 | Lesesky et al. . |
| 5,867,998 | 2/1999 | Guertin .................................... 62/225 |

*Primary Examiner*—Harry B. Tanner
*Attorney, Agent, or Firm*—Niro, Scavone, Haller & Niro

[57] ABSTRACT

An system and process for controlling an electronic exchange valve for an transport refrigeration system evaporator in the absence of a evaporator outlet pressure transducer reading is disclosed. The process includes monitoring for the absence of reliable evaporator outlet pressure readings, monitoring the supply air temperature, and supplying the supply air temperature to a processor within a controller for use in an algorithm so as to approximate the saturation reference temperature and superheat levels to derive the necessary control signals for the EXV.

4 Claims, 3 Drawing Sheets

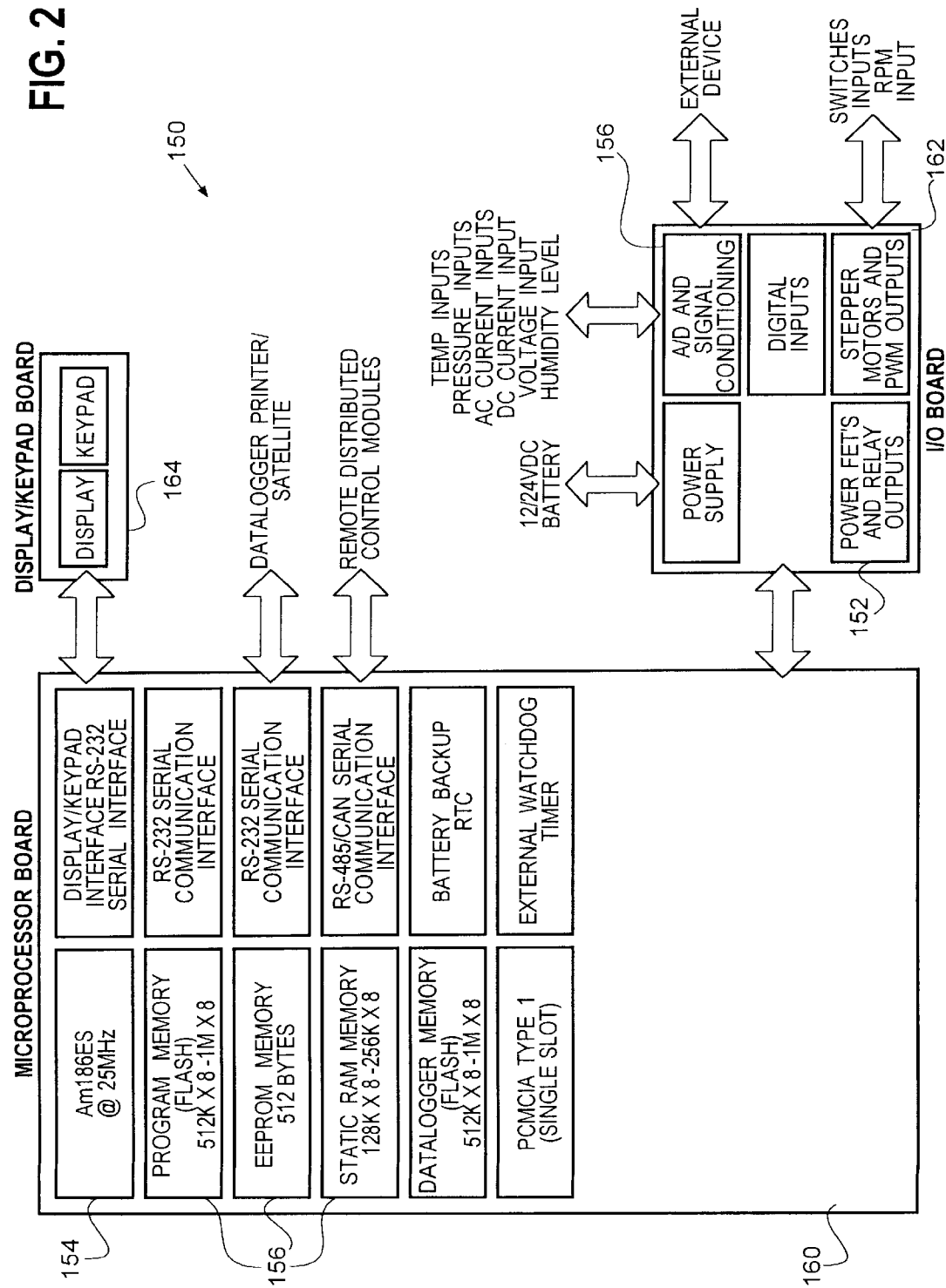

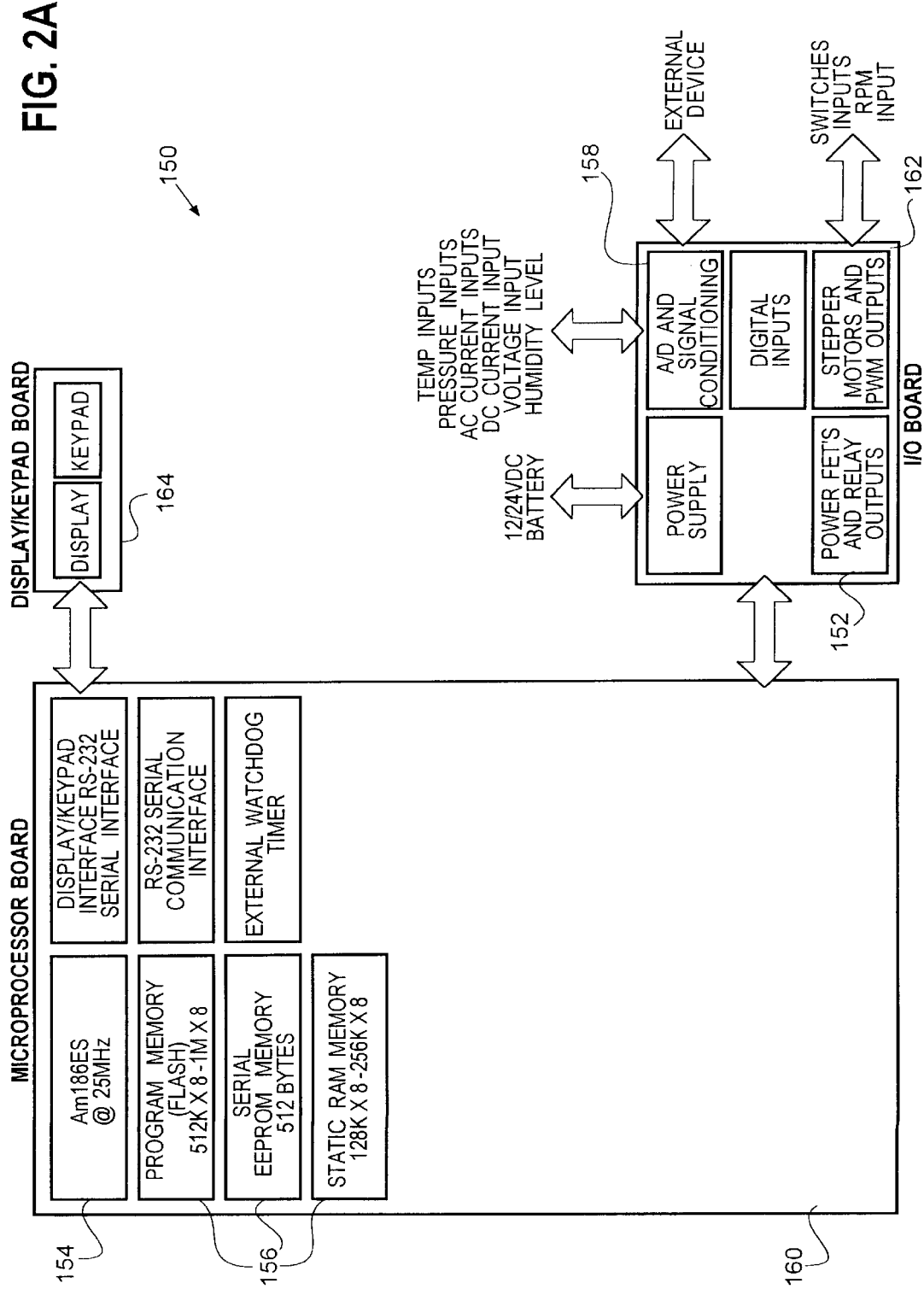

6,148,628

ELECTRONIC EXPANSION VALVE WITHOUT PRESSURE SENSOR READING

FIELD OF THE INVENTION

The field of the present invention relates to control systems for transport refrigeration systems. More specifically, the present invention is directed towards enabling the actuation of an electronic expansion valve in a transport refrigeration system without the benefit of an evaporator refrigerant outlet pressure reading or measurement.

DESCRIPTION OF THE PRIOR ART AND SUMMARY OF THE INVENTION

A transport refrigeration system used to control enclosed areas, such as the box used on trucks, trailers, containers, or similar intermodal units, functions by absorbing heat from the enclosed area and releasing heat outside of the box into the environment. To accomplish this, a typical transport refrigeration unit requires a highly pressurized refrigerant is introduced into a low pressure environment such as an evaporator coil. The refrigerant absorbs heat from the box return air across the evaporator coil and boils and evaporates. This refrigerant vapor is removed from the evaporator, and is compressed to a higher temperature and higher pressure through the use of a compressor, and is then turned back into liquid refrigerant by passing through a condenser.

The flow of refrigerant through the evaporator coil is typically controlled by a valve, such as an electronic expansion valve or EXV.

Refrigeration systems, including particularly refrigeration transport systems, requires operation under a wide variety of ambient temperatures and operating loads. The applicants have found that, in order to operate properly under low box temperature conditions, it was desirable to use particular commercially available pressure transducers for sensing the evaporator refrigerant in order to obtain high accuracy in reading the evaporator outlet pressure under low box temperature conditions. Unfortunately, this transducer does not result in accurate readings outside a refrigerant pressure range of −14.7 psig to about 100 psig.

Therefore, the present invention discloses a system and process for controlling an electronic exchange valve for an transport refrigeration system evaporator in the absence of a evaporator outlet pressure transducer reading. The process includes monitoring for the absence of reliable evaporator outlet pressure readings, monitoring the supply air temperature, and supplying the supply air temperature to a processor within a controller for use in an algorithm so as to approximate the saturation reference temperature and superheat levels to derive the necessary control signals for the EXV.

Accordingly, one object of the present invention is to provide a microprocessor control for the calculation of superheat levels to control an EXV.

It is a further object of the invention to provide a microprocessor control for approximating superheat levels in the absence of a reliable evaporator outlet pressure reading.

It is another object of the present invention to provide a process for utilizing box supply air temperature to calculate actual superheat levels for an evaporator so as to control an EXV.

These and other objects, features, and advantages of the present invention will become more apparent in light of the following detailed description of a best mode embodiment thereof, and as illustrated in the accompanying drawings.

BRIEF DESCRIPTION OF THE DRAWINGS

FIG. 2 shows a block schematic of a first preferred embodiment of a controller of the present invention; and FIG. 2a shows a block schematic of a second preferred embodiment of a controller of the present invention.

DETAILED DESCRIPTION OF THE INVENTION

Figure 1:
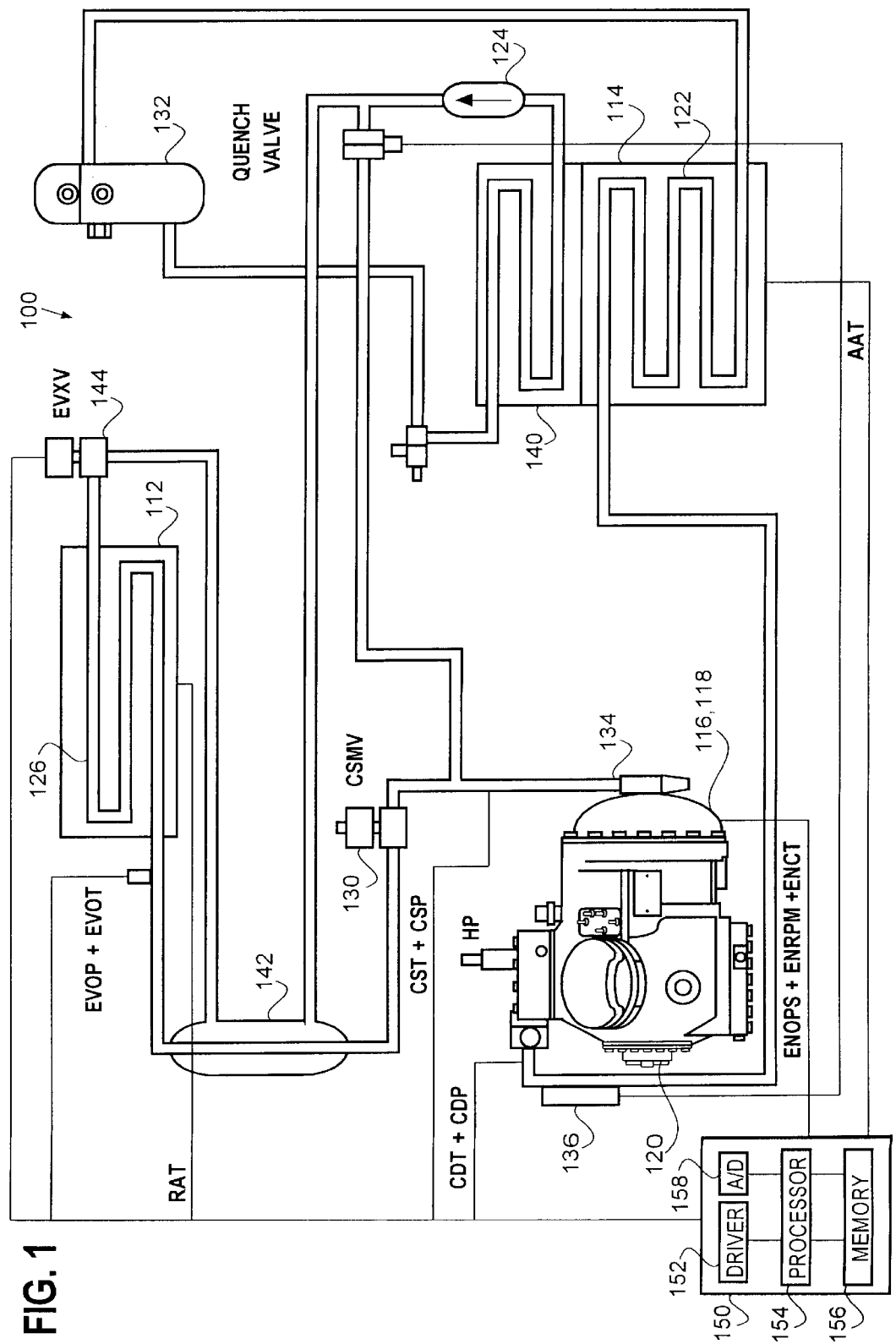
FIG. 1 shows a schematic of the transport refrigeration system of the present invention.

The invention that is the subject of the present application is one of a series of applications dealing with transport refrigeration system design and control, the other copending applications including: "Voltage Control Using Engine Speed" (U.S. patent application Ser. No. 09/277,507); "Economy Mode For Transport Refrigeration Units" (U.S. Pat. No. 6,044,651); "Compressor Operating Envelope Management" (U.S. patent application Ser. No. 09/277,473); "High Engine Coolant Temperature Control" (U.S. patent application Ser. No. 09/277,472); "Generator Power Management" (U.S. patent application Ser. No. 09/277,509); and "Electronic Expansion Valve Control Without Pressure Sensor Reading" (U.S. patent application Ser. No. 09/277,333) all of which are assigned to the assignees of the present invention and which are hereby incorporated herein by reference. These inventions are most preferably designed for use in transportation refrigeration systems of the type described in copending applications entitled: "Transport Refrigeration Unit With Non-Synchronous Generator Power System;" Electrically Powered Trailer Refrigeration Unit With Integrally Mounted Diesel Driven Permanent Magnet Generator;" and "Transport Refrigeration Unit With Synchronous Generator Power System," each of which were invented by Robert Chopko, Kenneth Barrett, and James Wilson, and each of which were likewise assigned to the assignees of the present invention. The teachings and disclosures of these applications are likewise incorporated herein by reference.

FIG. 1 illustrates a schematic representation of the transport refrigeration system 100 of the present invention. The refrigerant (which, in its most preferred embodiment is R404A) is used to cool the box air (i.e., the air within the container or trailer or truck) of the refrigeration transport system 100. is first compressed by a compressor 116, which is driven by a motor 118, which is most preferably an integrated electric drive motor driven by a synchronous generator (not shown) operating at low speed (most preferably 45 Hz) or high speed (most preferably 65 Hz). Another preferred embodiment of the present invention, however, provides for motor 118 to be a diesel engine, most preferably a four cylinder, 2200 cc displacement diesel engine which preferably operates at a high speed (about 1950 RPM) or at low speed (about 1350 RPM). The motor or engine 118 most preferably drives a 6 cylinder compressor 116 having a displacement of 600 cc, the compressor 116 further having two unloaders, each for selectively unloading a pair of cylinders under selective operating conditions.

In the compressor 116, the (preferably vapor state) refrigerant is compressed to a higher temperature and pressure. The refrigerant then moves to the air-cooled condenser 114, which includes a plurality of condenser coil fins and tubes 122, which receive air, typically blown by a condenser fan (not shown). By removing latent heat through this step, the refrigerant condenses to a high pressure/high temperature liquid and flow to a receiver 132 that provides storage for excess liquid refrigerant during low temperature operation.

From the receiver 132, the refrigerant flows through subcooler unit 140, then to a filter-drier 124 which keeps the refrigerant clean and dry, and then to a heat exchanger 142, which increases the refrigerant subcooling.

Finally, the refrigerant flows to an electronic expansion valve 144 (the "EXV"). As the liquid refrigerant passes through the orifice of the EXV, at least some of it vaporizes. The refrigerant then flows through the tubes or coils 126 of the evaporator 112, which absorbs heat from the return air (i.e., air returning from the box) and in so doing, vaporizes the remaining liquid refrigerant. The return air is preferably drawn or pushed across the tubes or coils 126 by at least one evaporator fan (not shown). The refrigerant vapor is then drawn from the exhanger 112 through a suction modulation valve (or "SMV") back into the compressor.

Many of the points in the transport refrigeration system are monitored and controlled by a controller 150. As shown in FIGS. 2 and 2A Controller 150 preferably includes a microprocessor 154 and its associated memory 156. The memory 156 of controller 150 can contain operator or owner preselected, desired values for various operating parameters within the system, including, but not limited to temperature set point for various locations within the system 100 or the box, pressure limits, current limits, engine speed limits, and any variety of other desired operating parameters or limits with the system 100. Controller 150 most preferably includes a microprocessor board 160 that contains microprocessor 154 and memory 156, an input/output (I/O) board 162, which contains an analog to digital converter 156 which receives temperature inputs and pressure inputs from various points in the system, AC current inputs, DC current inputs, voltage inputs and humidity level inputs. In addition, I/O board 162 includes drive circuits or field effect transistors ("FETs") and relays which receive signals or current from the controller 150 and in turn control various external or peripheral devices in the system 100, such as SMV 130, EXV 144 and the speed of engine 118 through a solenoid (not shown).

Among the specific sensors and transducers most preferably monitored by controller 150 includes: the return air temperature (RAT) sensor which inputs into the processor 154 a variable resistor value according to the evaporator return air temperature; the ambient air temperature (AAT) which inputs into microprocessor 154 a variable resistor value according to the ambient air temperature read in front of the condenser 114; the compressor suction temperature (CST) sensor; which inputs to the microprocessor a variable resistor value according to the compressor suction temperature; the compressor discharge temperature (CDT) sensor, which inputs to microprocessor 154 a resistor value according to the compressor discharge temperature inside the cylinder head of compressor 116; the evaporator outlet temperature (EVOT) sensor, which inputs to microprocessor 154 a variable resistor value according to the outlet temperature of evaporator 112; the generator temperature (GENT) sensor, which inputs to microprocessor 154 a resistor value according to the generator temperature; the engine coolant temperature (ENCT) sensor, which inputs to microprocessor 154 a variable resistor value according to the engine coolant temperature of engine 118; the compressor suction pressure (CSP) transducer, which inputs to microprocessor 154 a variable voltage according to the compressor suction value of compressor 116; the compressor discharge pressure (CDP) transducer, which inputs to microprocessor 154 a variable voltage according to the compressor discharge value of compressor 116; the evaporator outlet pressure (EVOP) transducer which inputs to microprocessor 154 a variable voltage according to the evaporator outlet pressure or evaporator 112; the engine oil pressure switch (ENOPS), which inputs to microprocessor 154 an engine oil pressure value from engine 118; direct current and alternating current sensors (CT1 and CT2, respectively), which input to microprocessor 154 a variable voltage values corresponding to the current drawn by the system 100 and an engine RPM (ENRPM) transducer, which inputs to microprocessor 154 a variable frequency according to the engine RPM of engine 118.

The advantages of the present invention are best understood when it is realized that high accuracy is needed in reading the EVOP value under low box conditions. Thus, the use of a pressure transducer which happens to have a range or −14.7 to 100 psig is desirable. Because of this system limitation, no correct EVOP reading is available once the temperature of the box for the system exceeded approximately 55° F. (i.e., conditions resulting in a refrigerant pressure outside the range of the EVOP transducer).

An EXV, such as EXV 144 is controlled by controller 150, which uses control logic to calculate the desired EXV position based upon the difference between a desired evaporator outlet refrigerant superheat (typically stored, such as in memory 156) and the actual evaporator outlet superheat. In order to calculate the actual evaporator outlet superheat, the refrigerant saturated temperature at the control point is need. Normally, such information is calculated from the EVOP. If, due to conditions such as those described above, such a reading is not available, the refrigerant saturated temperature can be estimated from the evaporator outlet air temperature (i.e., the air being supplied to the box of system 100) using the following equation:

Ref. Saturated Temp.=Supply Air Temp.−$\Delta T$

Where $\Delta T$=f (fan speed, evaporator coil, and box temperature). Those of skill in the art will be able to approximate $\Delta T$ in light of the teaching of the present invention, and will further appreciate that that value will vary depending upon the components used in a particular system. Based upon testing, assignee has determined that its commercial embodiments of the present invention could approximate $\Delta T$ as a constant of 3° C. In addition, applicants have found that whenever controller 150 exercises this control mode, the desired superheat level can be set to a constant.

In applicants' most preferred embodiment, this control process is actuated whenever the EVOP value is above 99 psig for a predetermined period of time (e.g., 20 seconds) and compressor 116 has been on for some time (e.g., 5 minutes or more). For control stability and accuracy purposes, this control process, when engaged, should preferably be in effect (i.e., monitoring return air and calculating reference saturated temperatures) for a minimum period of time (e.g., 2 minutes). Also, whenever the system is switching to or from this control process, the desired superheat setting should be gradually ramped up or down to its desired level over a period of time (e.g., at least 60 seconds).

It will be appreciated by those skilled in the art that various changes, additions, omissions, and modifications can be made to the illustrated embodiments without departing from the spirit of the present invention. All such modifications and changes are intended to be covered by the following claims.

We claim:

1. A method to control the electronic expansion valve of a refrigeration system without using an evaporator outlet pressure transducer reading, said method comprising the steps of:

i monitoring the supply air temperature of the refrigeration system leaving the evaporator;

ii applying the supply air temperature reading of the refrigeration system to an algorithm stored within the controller memory to derive the approximate, actual superheat level of the refrigeration system;

iii comparing said approximate, actual superheat level to a preselected desired superheat level stored within said controller memory;

iv selectively actuating said electronic expansion valve in response to control commands from said controller, said control commands compensating for differences between said approximate, actual superheat level and said preselected desired superheat level.

2. A method to control the electronic expansion valve of a refrigeration system without using an evaporator outlet pressure transducer reading, said method comprising the steps of:

i monitoring the return air temperature of the refrigeration system leaving the evaporator;

ii applying the return air temperature of the refrigeration system to an algorithm stored within the controller memory to derive the approximate, actual superheat level of the refrigeration system;

iii comparing said approximate, actual superheat level to a preselected desired superheat level stored within said controller memory;

iv selectively actuating said electronic expansion valve in response to control commands from said controller, said control commands compensating for differences between said approximate, actual superheat level and said preselected desired superheat level.

3. The method of claims 1 or 2, further comprising the steps of monitoring engine speed and applying said engine speed reading to said algorithm stored within the controller memory to derive the approximate, actual superheat level of the refrigeration system.

4. The method of claims 1 or 2, further comprising the steps of monitoring evaporator fan speed and applying said evaporator fan speed reading to said algorithm stored within the controller memory to derive the approximate, actual superheat level of the refrigeration system.

* * * * *